United States Patent [19]

Okubo et al.

[11] Patent Number: 4,874,918

[45] Date of Patent: Oct. 17, 1989

[54] VACUUM BRAZING APPARATUS

[75] Inventors: Osamu Okubo; Takeo Kato; Tetsurou Tsushima, all of Kanagawa, Japan

[73] Assignees: Nihon Sinku Gijutsu Kabusiki Kaisha, Kanagawa; Nippondenso Co., Ltd., Aichi, both of Japan

[21] Appl. No.: 155,288

[22] Filed: Feb. 12, 1988

[30] Foreign Application Priority Data

Feb. 14, 1987 [JP] Japan ................... 62-31815
Feb. 14, 1987 [JP] Japan ................... 62-31816

[51] Int. Cl.$^4$ ............................................. B23K 1/02
[52] U.S. Cl. ............................. 219/85.11; 219/85.17
[58] Field of Search ............. 219/85 E, 85 BA, 85 A, 219/85 BM, 85 CM, 85.11, 85.12, 85.13, 85.14, 85.15, 85.16, 85.17, 85.2

[56] References Cited

U.S. PATENT DOCUMENTS

| 2,373,116 | 4/1945 | Hobrock | 219/85 E |
| 2,943,181 | 6/1960 | Gunow et al. | 219/85 E |
| 3,093,104 | 6/1963 | Bukata | 219/85 E |
| 4,140,266 | 2/1979 | Wagner | 219/85 E |

FOREIGN PATENT DOCUMENTS 55-26953 7/1980 Japan .
55-17630 4/1982 Japan .

Primary Examiner—H. Broome
Assistant Examiner—Lincoln Donovan
Attorney, Agent, or Firm—Jones, Day, Reavis & Pogue

[57] ABSTRACT

In a vacuum brazing apparatus in which articles provided with brazing material are heated to be brazed with each other in a vacuum chamber, no heating means for brazing are arranged in the inside of the vacuum chamber, and heating means are so arranged outside of the vacuum chamber as to heat the vacuum chamber.

14 Claims, 3 Drawing Sheets

VACUUM BRAZING APPARATUS

BACKGROUND OF THE INVENTION

1. Field of the Invention

This invention relates to a vacuum brazing or soldering apparatus in which articles provided or clad with soldering or brazing material are heated and brazed with each other in a vacuum chamber.

2. Description of the Prior Art

In a prior vacuum brazing or soldering apparatus, a heating system consisting of a heater, electrodes, insulators, etc., and a reflector for reflecting heat from the heater and thermally shielding are arranged inside of a vacuum chamber. Articles provided with brazing material are heated by the heat from the heater and the radiant heat from the reflector, and so they are brazed or soldered to each other. The surface area of the inside wall of the vacuum chamber is large, and the whole of the vacuum chamber is large-sized. Further, the heating system functions as a gas-emitting source. Accordingly, it requires long time to vacuumize the vacuum chamber.

Further, in the prior vacuum brazing apparatus, while the inside wall of the vacuum chamber is thermally insulated by the reflector, the outside wall of the vacuum chamber is cooled with water. For example, the temperatures of the electrodes, inside wall of the vacuum chamber and back side of the reflector adjacent to the inside wall of the vacuum chamber become relatively low. Accordingly, various gases, oil, evaporating metal elements emitted from the articles to be brazed, adhere onto the electrodes, the inside wall of the vacuum chamber and the back side of the reflector. There occur the problems that the amount of the emitting gas increases on vaccumizing the vacuum chamber and that the electrical insulating parts are deteriorated. In order to solve the above problems, the inside of the vacuum chamber should be periodically cleaned. In the cleaning operation, the heating system should be decomposited. One cleaning operation requires usually about three weeks. The cleaning operation should be effected usually once or twice a year. The working efficiency of the apparatus is low.

SUMMARY OF THE INVENTION

Accordingly, it is an object of the invention to provide a vacuum brazing apparatus which can be small-sized, and in which the vacuum chamber can be highly vacuumized in a short time.

Another object of this invention is to provide a vacuum brazing apparatus for which the number of maintenance, inspection and cleaning can be reduced in comparison with the prior vacuum brazing apparatus, resulting in improvement of working efficiency of the apparatus.

In accordance with an aspect of this invention, in a vacuum brazing apparatus in which articles provided with brazing material are heated to be brazed with each other in a vacuum chamber there are, no heating means for brazing arranged in the inside of said vacuum chamber, and the heating means are so arranged outside of said vacuum chamber as to heat said vacuum chamber.

The foregoing and other objects, features, and advantages of the present invention will be more readily understood upon consideration of the following detailed description of the preferred embodiments of the invention, taken in conjunction with the accompanying drawings.

DESCRIPTION OF THE PREFERRED EMBODIMENTS

Next, vacuum soldering or brazing apparatus for soldering or brazing by aluminium system soldering or brazing material according to embodiments of this invention will be described with reference to the drawings.

Figure 1:
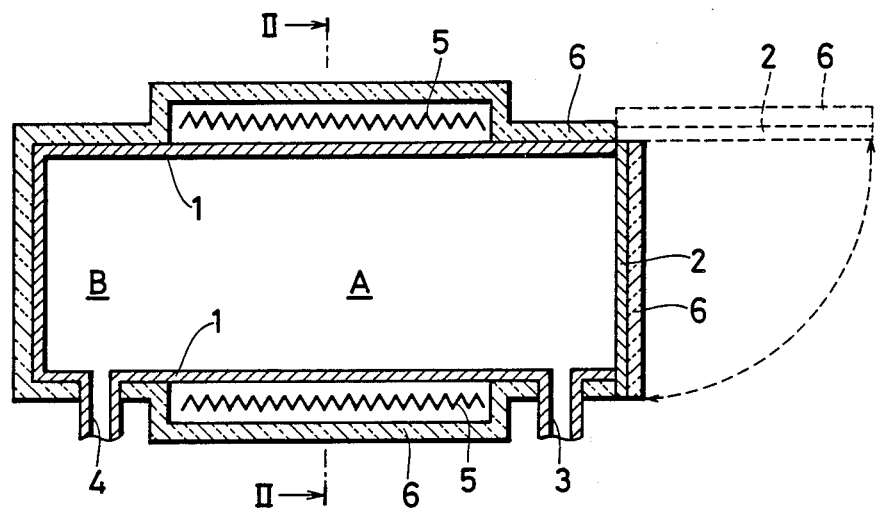
FIG. 1 is a cross-sectional view of a vacuum brazing apparatus according to a first embodiment of this invention.
Figure 2:
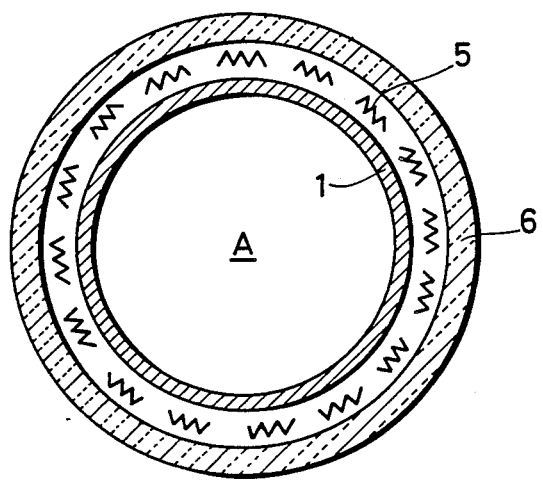
FIG. 2 is a cross-sectional view taken along the line II-II in FIG. 1.

FIG. 1 and FIG. 2 show a first embodiment of this invention. In FIG. 1 and FIG. 2, a vacuum chamber 1 is cylindrical and its one end is opened. The one end is air-tightly closed by cover member 2. The cover member 2 can be opened and closed as shown by the dash-lines in FIG. 1. Articles to be soldered, are first provided with soldering or brazing material and are then inserted into the vacuum chamber 1 from the one end. An inert or $N_2$ gas inlet opening 3 and a discharging opening 4 are formed in the peripheral wall of the vacuum chamber 1.

No heating system is provided in the inside of the vacuum chamber 2, in contrast to the prior art. The internal space of the vacuum chamber 1 consists of a heating region A and a Mg-trap region B. An electrical heater 5 is arranged concentric with the heating region A outside of the chamber. Thus, this embodiment is of the resistance-heating type. An adiabatic or thermally insulating material 6 covers the electrical heater 5, the cover member 2, and the vacuum chamber 1.

The first embodiment of this invention is constructed as above. Next, its operation and effect will be described.

First, the cover 2 is opened as shown by the dash-lines in FIG. 1. Plural articles to be soldered or brazed, are inserted into the heating region A. The one end of the vacuum chamber 1 is covered with the cover member 2, as shown by the solid line in FIG. 1. The vacuum chamber 1 is vacuumized through the discharging opening 4 by a not-shown vacuum apparatus. And an electric current is flowed through the electrical heater 5 to heat the vacuum chamber 1. On the other hand, an inert or $N_2$ gas is led into the vacuum chamber 1 from the inert gas inlet opening 3. The inert or $N_2$ gas flows leftwards in FIG. 1. The inert gas is discharged through the discharging opening 4 to the vacuum apparatus.

The articles to be soldered or brazed are heated with radiation heat from the internal wall of the vacuum chamber 1. Thus, the desired soldering or brazing operations are effected. Then, Mg vapor from the soldering material of aluminium system is flowed leftwards in FIG. 1 and Mg-elements are coagulated on the internal wall in the Mg-trap region B which is held at a lower temperature than the heating region A.

There has been described the operations of the first embodiment. Next, the advantages of this embodiment will be described.

In contrast of the prior art apparatus, no heating system is arranged in the inside of the vacuum chamber 1. Accordingly, the whole apparatus can be small-sized, and gas emitting sources are reduced. It becomes easy to highly exhaust or vacuumize the chamber 1. Further, it becomes simple to clean the inside of the vacuum chamber 1. The maintenance and inspection can be easily effected. Further, the interval of the maintenance and inspection can be increased in comparison with the prior art. Thus, the working efficiency of the vacuum apparatus can be improved.

Figure 3:
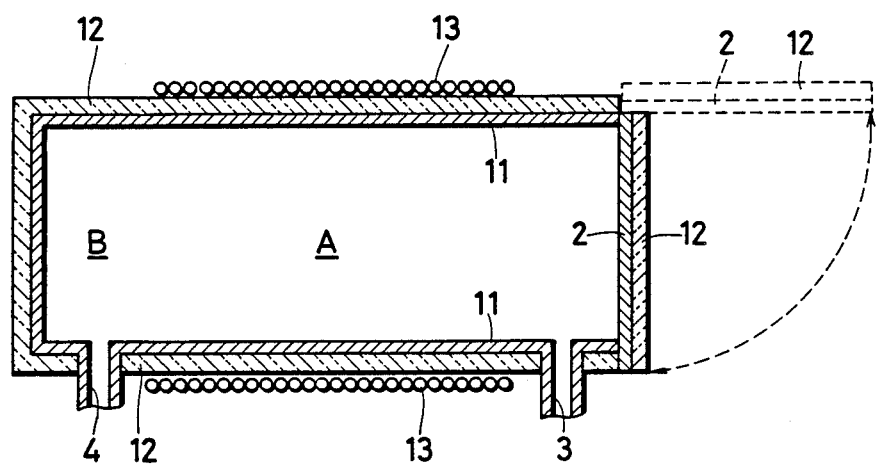
FIG. 3 and FIG. 4 are cross-sectional views of vacuum brazing apparatus according to second and third embodiment of this invention.

FIG. 3 shows a second embodiment of this invention. Parts in FIG. 3 which correspond to those in the first embodiment, are denoted by the same reference numerals, the description of which will be omitted.

A vacuum chamber 11 is cylindrical and is made of metal.

An adiabatic or insulating material 12 covers the outer surfaces of the vacuum chamber 11. And an induction heating coil 13 is concentrically wound in correspondence with a heating region A outside of the vacuum chamber 11. On heating, an alternating current is flowed through the coil 13. Thus, currents are induced in the peripheral direction of the wall of the vacuum chamber 11. "Joule" heat is generated to heat the vacuum chamber 11.

This embodiment operates in the same manner as the first embodiment. The advantage is the same as that of the first embodiment. Accordingly, their description will be omitted.

Figure 4:
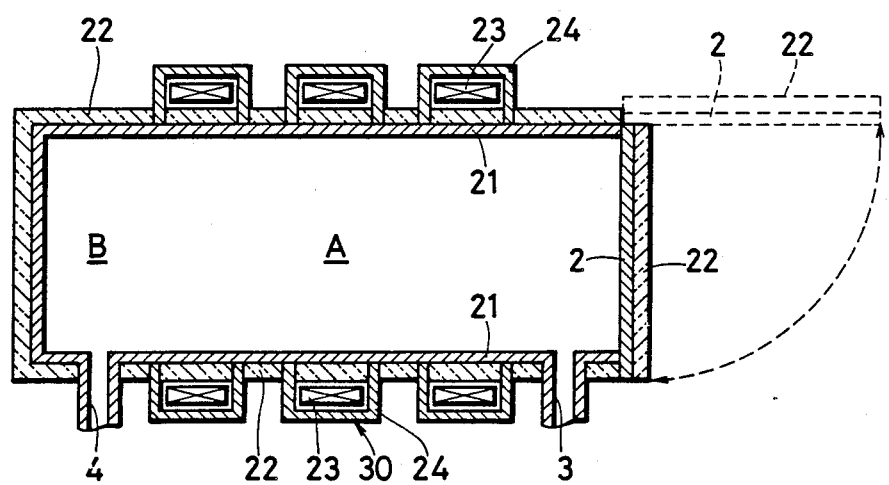

FIG. 4 shows a third embodiment of this invention. Parts in FIG. 4 which correspond to those in the above embodiments are denoted by the same reference numerals, the description of which will be omitted.

Also in this embodiment, a vacuum chamber 21 is cylindrical and is made of metal. An adiabatic or insulating material 22 covers the outer peripheral surfaces of the wall of the vacuum chamber 21, and an induction heating coil apparatus 30 is arranged around the vacuum chamber 21 in correspondence with a heating region A. In the coil apparatus 30, primary coil winding 23 is wound on the peripheral surface of the wall of the vacuum chamber 21 and secondary coil winding 24 is wound on the outside of the primary coil winding 23. When an alternate current is flowed through the primary coil winding 23, an alternate voltage is induced in the secondary coil winding 24. Thus, a current flows through the wall of the vacuum chamber 21 which contacts electrically with the secondary coil winding 24.

This embodiment has the same operation as the first embodiment and the same effect as it. Accordingly, their description will be omitted.

Next, a fourth embodiment of this invention will be described with reference to FIG. 5.

A vacuum chamber 31 is generally cylindrical and is opened at the right end. It is air-tightly covered with a cover member 32. It is, as occasion demands, opened as shown by the dash-line. A first discharge opening 33, a second discharge opening 34 and an inert gas or $N_2$ gas inlet opening 35 are formed in the peripheral wall portion of the vacuum chamber 31. Further, a second inert gas or $N_2$ gas inlet opening 36 and a dry air inlet opening 37 are formed in the left end wall portion of the vacuum chamber 31.

A gate 38 is arranged in the interior of the vacuum chamber 31. The gate 38 is double-type gate and it consists of gate members 38a and 38b. They are opened as shown by the dash line arrow. The internal space of the vacuum chamber 31 is divided into a heating region A and a Mg-trap region B by the gate 38. An induction heating coil 39 is wound on the peripheral wall of the vacuum chamber 31 in correspondence with the heating region A.

Electrical heaters 40a, 40b are attached to the gate member 38a and 38b and further, an electrical heater 41 is attached to the cover member 32. However, no heating system for soldering or brazing articles provided with brazing material is arranged in the heating region A. In the soldering or brazing operation, the articles provided with brazing or soldering material are arranged in the heating region A, and the cover member 32 is closed.

Figure 5:
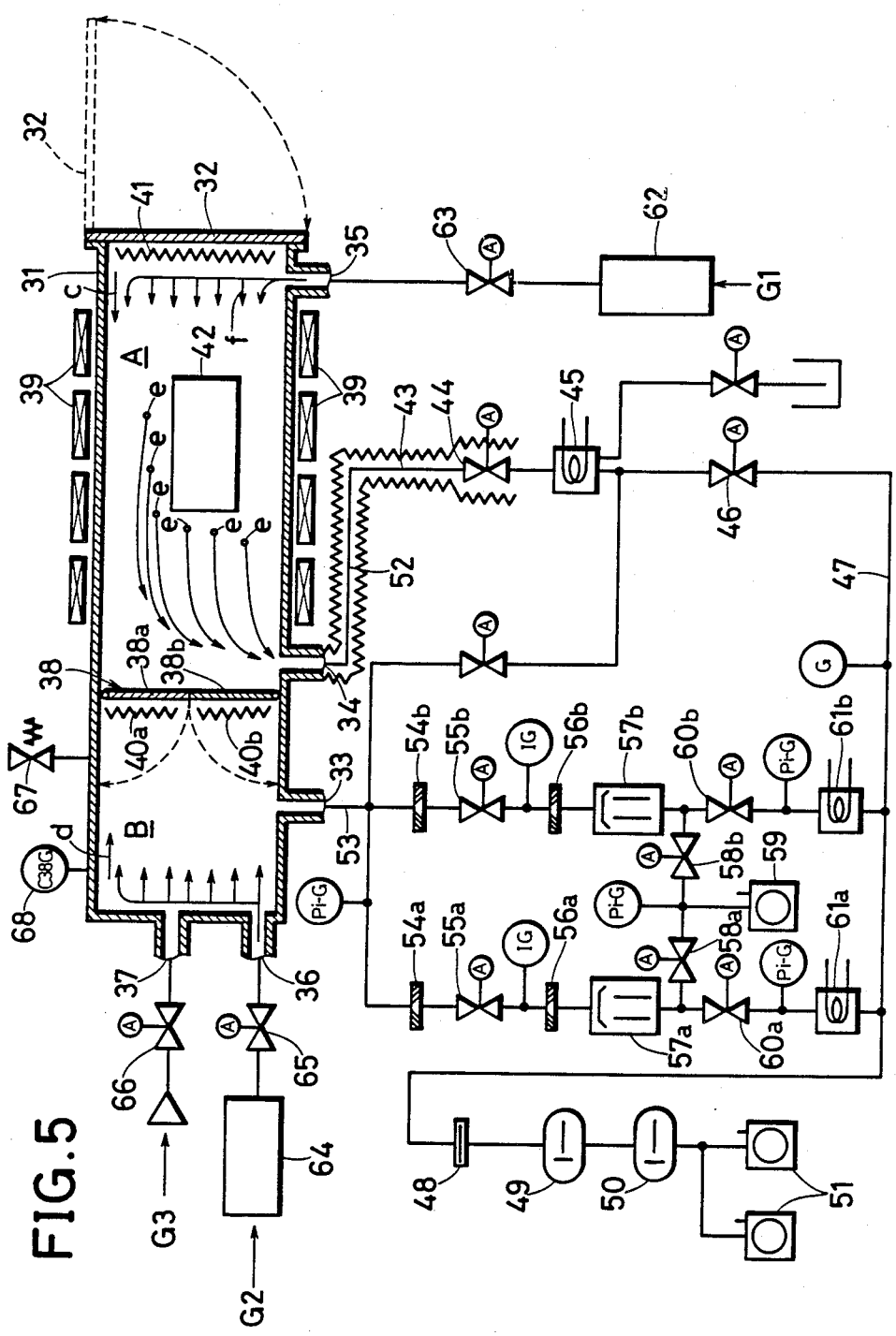
FIG. 5 is a cross-sectional view of a vacuum brazing apparatus according to a fourth embodiment of this invention, in which a conduit system connected to the apparatus is shown together.

As shown in FIG. 5, the second discharge opening 34 is formed at the right side of the gate 38 or in the heating region A. A conduit 43 is connected to the second discharge opening 34. In turn, an electro-magnetic valve 44, an oil trap 45 and an electro-magnetic valve 46 are arranged in the conduit 43. Further, a Mg-trap/dust filter 48, mechanical boosters 49, 50 and a rotary vacuum pump 51 are connected through a conduit 47. Further, an electrical heater 52 is attached also to the conduit 43 and the electro-magnetic valve 44.

The first discharge opening 33 is formed at the left side of the gate 38 or in the Mg-trap region B. A conduit 53 is connected to the first discharge opening 33. In parallel with the conduit 53, Mg-traps 54a, 54b, electro-magnetic valves 55a, 55b, water-cooling baffles 56a, 56b, diffusion pumps 57a, 57b, electro-magnetic valves 60a, 60b and oil traps 61a, 61b are connected. Further, in common with them, the above Mg-trap/dust filter 48, mechanical boosters 49, 50 and the rotary vacuum pump 51 are connected through the conduit 47. Further, the down-stream side of the diffusion pumps 57a, 57b are connected through electro-magnetic valves 58a, 58b to a rotary vacuum pump 59.

A flow-meter 62 and an electro-magnetic valve 63 are connected to the inert gas or $N_2$ gas inlet opening 35. An inert gas or $N_2$ gas $G_1$ is led into the vacuum chamber 31 through the flow-meter 62 and the electro-magnetic valve 63. Further, a flow-meter 64 and an electro-magnetic valve 65 are connected to the second inert gas or $N_2$ gas inlet opening 36 formed on the left end portion of the vacuum chamber 31. An inert gas or $N_2$ gas as $G_2$ is led through them into the vacuum chamber 31. The inert gases or $N_2$ gas $G_1$ and $G_2$ may be the same. A dry air $G_3$ is led through a electro-magnetic valve 66 into the dry air inlet opening 37. Normally, the electro-magnetic valve 66 remains closed. It is used for drying the inside of the vacuum chamber 31. Reference numerals 68, 67 represent a pressure gauge and a safety valve, respectively.

There has been described construction of the vacuum brazing apparatus of the fourth embodiment of this invention. Next, there will be described operations of this embodiment.

First, the cover member 32 is opened as shown by the dash line. Articles 42 provided or clad with brazing material are arranged in the heating region A of the inside of the vacuum chamber 31. Then, the internal gate 38 remains closed as shown by the solid line. The cover member 32 is closed. Alternate current is flowed through the induction heating coil 39. The portions of the vacuum chamber 31 corresponding to the heating region A is heated by induced currents. Further, currents are flowed through the electrical heaters 40a, 40b, 41, 52. Thus, the gate 38, the cover member 32, the conduit 43 and the valve 44 are heated.

The valve 44 is opened, and the mechanical boosters 49, 50 and the rotary vacuum pump 51 are driven. At this time, the diffusion pumps 57a, 57b are not yet driven. The valve 63 is opened and so the inert gas or N$_2$ gas G$_1$ is introduced into the vacuum chamber 31 through the inert gas or N$_2$ gas inlet opening 35. It is flowed in the direction as shown by the arrow C, by the vacuumizing or exhausting action of the rotary vacuum pump 51. Although not shown, an annular nozzle member is connected to the inert gas inlet opening 35 and arranged in the vacuum tank 31. Numerous nozzle openings of the not shown annular nozzle member eject the inert gas or N$_2$ gas G$_1$ as shown by the arrows f.

The vacuum chamber 31 is vacuumized or exhausted to a relatively low vacuum degree by the rotary vacuum pump 51. On the other hand, adhering materials e such as oil are ejected, as shown by the arrows, from the surfaces of the articles 42 to be brazed, with the rise of the heating temperature. However, these materials e are led towards the second discharge opening 34 with good efficiency by the inert gas or N$_2$ gas flow. They are led through the conduit 43, and the electro-magnetic valve 44 and trapped in the oil trap 45. Further, the inert gas or N$_2$ gas G$_2$ is introduced into the vacuum chamber 31 from the second inert gas or N$_2$ gas inlet opening 36 and it flows in the direction shown by the arrow d. It passes through the gap of the gate 38 into the heating region. The gate 38 is not perfectly air-tight.

The flow speed of the gas is lower than the flow speed of the gas from the first inert gas inlet opening 35. Accordingly, the adhering materials e such as oil ejected from the articles 42 to be brazed are prevented from invading into the Mg-trap region B. And the flow does not prevent the inert-gas or N$_2$ gas from the inlet opening 35, from smoothly flowing left-wards.

When adhering materials e such as oil emitted from the articles 42 become little, the gate 38 is opened as shown by the dash line. Now, the diffusion pumps 57a, 57b are started to drive. The valve 65 is closed to stop the inert gas or N$_2$ gas introduction from the second inert gas or N$_2$ gas inlet opening 36. The rotary vacuum pump 51 may remain driven. And in this embodiment, the heating temperature of the coil 39 is further rised to a certain degree.

The vacuum chamber 31 is vacuumized or exhausted to a relatively high vacuum degree (about $10^{-5}$ Torr) and the soldering or brazing operation is effected.

Then, Mg or other metal components emitted from the brazing material are trapped on the inside wall of the vacuum chamber 31 in the Mg trap region B. They are smoothly flowed towards the Mg-trap region B from the heating region A by the inert gas or N$_2$ gas flow.

There have been described operations of this embodiment. Next, there will be described advantages of this embodiment.

In the fourth embodiment, the articles 42 to be brazed, are heated first under the relatively low vacuum, and adhering materials, oil or the like emitted from the articles 42 provided or clad with brazing material are discharged from the second discharging opening 34. They are trapped by the oil trap 45. After the adhering materials, oil or the like come to be emitted scarcely from the articles 42, the diffusion pumps 57a, 57b start to be driven. Thus, the inside of the vacuum chamber 31 is put into the relatively high vacuum, and then the brazing operation is effected for the articles 42. Accordingly, little adhering material, oil or the like emitted from the articles 42 invades the high vacuum exhausting system including the diffusion pumps 57a, 57b. The diffusion pumps 57a, 57b and the other parts of the high vacuum exhausting system are not contaminated with the adhering material, oil or the like. They are prevented from being deteriorated.

Further, the adhering materials, oil or the like do not adhere to the gate 38, cover member 32, conduit 43 and electro-magnetic valve 44, since they are heated with the electrical heaters 40a, 40b, 41 and 52, respectively. The inside of the vacuum chamber 31 and the attachments are prevented from being contaminated.

Thus, the inside of the vacuum chamber can be always easily put into a high vacuum by the high vacuum exhausting system including the diffusion pumps 57a, 57b. They can be small-sized in comparison with that of the prior apparatus.

While the preferred embodiments have been described, variations thereto will occur to those skilled in the art within the scope of the present inventive concepts which are delineated by the following claims.

For example, the insides of the vacuum chambers 1, 11, 21 in the first, second and third embodiments are divided into the heating region A and the Mg-trap region B respectively. However, the region B may be omitted, and there may be only the heating region A.

Further, in the fourth embodiment, the second inert gas or N$_2$ gas opening 36 and the dry air gas inlet opening 37 are formed in the end wall for the vacuum tank. However they may be omitted.

Further, in the fourth embodiment, the Mg-trap region B may be omitted. In that case, the gate 38 divides merely the inside into the heating region A and the space communicating with the first discharge opening 33.

Further, the induction heating coil 39 is used as the heating means in the fourth embodiment, and it is arranged outside of the vacuum chamber. However, heating means for heating the articles to be brazed may be arranged inside of the vacuum chamber in the fourth embodiment.

Further, in the fourth embodiment, the batch-type has been described. However, it may be applied to the continuous type.

What is claimed is:
1. A vacuum brazing apparatus comprising:
a vacuum chamber the internal space of which consists of two regions, said regions being formed by the flow of an inert gas, the first region of said two regions being communicating with an inlet opening, in said first region are placed articles provided with brazing material being heated to be brazed with each other, the second region of said two regions being communicating with a discharge opening; and heating means arranged outside of an outer peripheral wall as to correspond to said first region in said vacuum chamber for heating said articles to be brazed, wherein metallic components of said brazing material emitted from said articles during the brazing operation are caused to flow from said first region toward said second region, the temperature of which is lower than that of said first region, by a flow of inert gas introduced from said inlet opening, and are coagulated on an internal wall of said vacuum chamber corresponding to said second region.

2. A vacuum brazing apparatus according to claim 1, in which said heating means is an electrical heater wound on said outer peripheral wall of said vacuum chamber, said vacuum chamber being heated by the resistance heating of said electrical heater.

3. A vacuum brazing apparatus according to claim 1, in which said vacuum chamber is made of metal, and said heating means is an induction coil winding on said outer peripheral wall of said vacuum chamber through which alternating current is caused to flow, said vacuum chamber being heated by the currents induced in said outer peripheral wall of said vacuum chamber.

4. A vacuum brazing apparatus according to claim 1, in which said vacuum chamber is made of metal, and said heating means is an induction heating apparatus, which consists of a primary winding wound through an adiabatic material on said outer peripheral wall of said vacuum chamber and a secondary winding wound outside of said primary winding, being electrically connected to said outer peripheral wall of said vacuum chamber, and alternating current is caused to flow through said primary winding to induce alternating current in said secondary winding, said vacuum chamber being heated by the induced current in said outer peripheral wall of said vacuum chamber.

5. A vacuum brazing apparatus according to claim 1, in which a second discharge opening is further made in the wall of said vacuum chamber, said discharge opening being connected to a first evacuation system for evacuating said vacuum chamber into a relatively high vacuum, and said second discharge opening being connected to a second evacuation system for evacuating said vacuum chamber into a relatively low vacuum, gate means are arranged between said discharge opening and said second discharge opening as to divide the internal space of said vacuum chamber into two regions, the first region of said two regions being communicating with said second discharge opening and the second region of said two regions being communicating with said discharge opening, and an oil trap is arranged in said second evacuation system, wherein said articles provided with brazing material are arranged in said first region, and heated by said heating means, said gate means are closed, oil or the like emitted from said article is introduced into said oil trap through said second discharge opening by said second evacuation system, and after some oil or the like starts to be emitted from said articles, said gate means are opened and the inside of said vacuum chamber is put into a high vacuum by said first evacuation system connected to said discharge opening which communicates with the second region of said two regions, so that the brazing operation is performed for said articles.

6. A vacuum brazing apparatus according to claim 5, in which the heating temperature of said heating means is increased to a predetermined temperature, after said gate means are opened.

7. A vacuum brazing apparatus according to claim 5, in which a second heating means is attached to said gate means.

8. A vacuum brazing apparatus according to claim 5, in which inert gas is introduced into said first region of the two regions, and oil or the like is forcibly led to said second discharge opening by the flow of said inert gas.

9. A vacuum brazing apparatus according to claim 5, in which inert gas is introduced into said vacuum chamber during the brazing operation, and components of said brazing material emitted from said articles are caused to flow toward said second region from said first region by the flow of said inert gas.

10. A vacuum brazing apparatus according to claim 9, in which said second region is a region for trapping metallic components emitted from said articles.

11. A vacuum brazing apparatus according to claim 5, in which said first vacuum evacuation system includes a diffusion pump.

12. The vacuum brazing apparatus in accordance with claim 8 where the specified inert gas is $N_2$.

13. The vacuum brazing apparatus in accordance with claim 9 where the specified inert gas is $N_2$.

14. A vacuum brazing apparatus comprising:
a vacuum chamber,
a first discharge opening and a second discharge opening each being made in the wall of said vacuum chamber, said first discharge opening being connected to a first evacuation system for evacuation said vacuum chamber into a relatively high vacuum, and said second discharge opening being connected to a second evacuation system for evacuating said vacuum chamber into a relatively low vacuum, gate means provided with a second heating means arranged between said first discharge opening and said second discharge opening as to divide the internal space of said vacuum chamber into two regions, the first region of said two regions being communicating with said second discharge opening and an inlet opening, the second region of said two regions being communicating with said first discharge opening, heating means for heating articles to be brazed, said articles being arranged in said first region of said two regions; and
an oil trap being arranged in said second evacuation system, wherein said articles provided with brazing material are arranged in said first region, and heated by said heating means, said gate means are closed, oil or the like emitted from said articles is introduced into said oil trap through said second discharge opening by said second evacuation system, and after some oil or the like is emitted from said articles, said gate means are opened and the inside of said vacuum chamber is put into a high vacuum by said first evacuation system connected to said first discharge opening which communicates with the second region of said two regions, so that the brazing operation is performed for said articles.

* * * * *